(12) United States Patent
Ichikawa et al.

(10) Patent No.: US 10,732,143 B2
(45) Date of Patent: Aug. 4, 2020

(54) GAS SENSOR ELEMENT AND GAS SENSOR UNIT

(71) Applicant: DENSO CORPORATION, Kariya, Aichi-pref. (JP)

(72) Inventors: Hiroki Ichikawa, Kariya (JP); Yusuke Todo, Kariya (JP); Takashi Araki, Kariya (JP)

(73) Assignee: DENSO CORPORATION, Kariya (JP)

( * ) Notice: Subject to any disclaimer, the term of this patent is extended or adjusted under 35 U.S.C. 154(b) by 98 days.

(21) Appl. No.: 15/850,150

(22) Filed: Dec. 21, 2017

(65) Prior Publication Data
US 2018/0172625 A1    Jun. 21, 2018

(30) Foreign Application Priority Data

Dec. 21, 2016   (JP) .................................. 2016-248147

(51) Int. Cl.
*G01N 27/407*  (2006.01)
*G01N 27/41*  (2006.01)

(52) U.S. Cl.
CPC ......... *G01N 27/41* (2013.01); *G01N 27/4075* (2013.01)

(58) Field of Classification Search
CPC ....... G01N 27/404–407; G01N 27/409; G01N 27/419; G01N 27/41; G01N 27/4072; G01N 27/4067; G01N 27/4074; G01N 27/417
See application file for complete search history.

(56) References Cited

U.S. PATENT DOCUMENTS

| | | | | |
|---|---|---|---|---|
| 6,787,014 | B2* | 9/2004 | Hasei | G01N 27/4074 204/424 |
| 2006/0231397 | A1* | 10/2006 | Nakagaki | G01N 27/4045 204/431 |
| 2013/0092537 | A1* | 4/2013 | Mizutani | G01N 27/419 204/427 |
| 2016/0209354 | A1 | 7/2016 | Araki et al. | |
| 2016/0209358 | A1 | 7/2016 | Toudou et al. | |
| 2016/0320334 | A1 | 11/2016 | Nakatou et al. | |
| 2017/0191957 | A1 | 7/2017 | Toudou et al. | |
| 2017/0219516 | A1 | 8/2017 | Toudou et al. | |
| 2018/0017520 | A1 | 1/2018 | Todo et al. | |

FOREIGN PATENT DOCUMENTS

| | | |
|---|---|---|
| JP | 2001-141696 | 5/2001 |
| JP | 2017-020838 | 1/2017 |

* cited by examiner

*Primary Examiner* — Gurpreet Kaur
(74) *Attorney, Agent, or Firm* — Nixon & Vanderhye, P.C.

(57) ABSTRACT

A gas sensor element of the present disclosure includes a measurement gas chamber, a pump cell, a sensor cell including a sensor electrode, and a pump-cell controller. When the gas sensor element is activated before detecting a concentration of a gas, in order to remove oxygen occluded in the sensor electrode, the pump-cell controller applies a removing voltage to the pump cell so that a reducing gas is generated. The sensor electrode has a plurality of noble metal regions which are made of noble metal and electrolyte regions which are distributed so that an interface is generated between a part of a solid electrolyte body and the plurality of noble metal regions. The sensor electrode has an open pore which extends from an electrode surface of the sensor electrode and reaches at least one of the plurality of noble metal regions.

5 Claims, 4 Drawing Sheets

FIG.1

Side View

GAS SENSOR ELEMENT AND GAS SENSOR UNIT

CROSS REFERENCE TO RELATED APPLICATIONS

This application is based on and claims the benefit of priority from Japanese Patent Application 2016-248147 filed on Dec. 21, 2016, the disclosures of which are incorporated in its entirety herein by reference.

BACKGROUND OF THE INVENTION

[Technical Field]

The present disclosure relates to a gas sensor element which detects a concentration of a specific gas in a measured gas and a gas sensor unit which are configured to include the gas sensor element.

[Background Art]

A gas sensor element which is configured to include a solid electrolyte body and an electrode provided on the solid electrolyte body and electrically detects a concentration of a specific gas in a measured gas by ionizing the measured gas has been known. In order to make such a gas sensor element usable as soon as possible, the solid electrolyte body and the electrode are required to be in an activated state early.

The activated state includes, for example, a state where the solid electrolyte body and the electrode are at appropriate temperatures for reaction of the specific gas and a state where a surface of the electrode is in an appropriate state for reaction of the specific gas. In particular, in order to achieve a surface in the appropriate state, Patent Literature 1 discloses a gas concentration detection device which includes a sensor electrode and a pump electrode as electrodes. A specific gas to be measured is ionized in the sensor electrode, and a concentration of the specific gas is detected based on an electric current (sensor current) corresponding to an amount of ionized specific gas. The gas concentration detection device is configured such that when a gas sensor element is activated, a removing voltage for removing oxygen is applied to the pump electrode so that a reducing gas is generated, and oxygen adsorbed to the sensor electrode reacts with the reducing gas and is removed. This allows the sensor electrode to be in a state where noise superimposed on a sensor current caused by an oxygen ion is reduced.

CITATION LIST

Patent Literature

[PTL 1] JP 2016-70922 A

SUMMARY

Technical Problem

It is considered that not all of the above-described reducing gas reacts with the oxygen on the sensor electrode and the reducing gas remains on a surface of the sensor electrode. Although the reducing gas is gradually removed from the surface of the sensor electrode and a sensor current caused by the reducing gas is stabilized at zero level, it is required that removal of the reducing gas be achieved earlier by early activation of the sensor electrode.

In view of this requirement, an object of the present disclosure is to achieve an earlier activated state of a gas sensor element and gas sensor unit in which oxygen occluded in a sensor electrode is reduced by using a reducing gas.

Solution to Problem

In order to achieve the object, a gas sensor element of the present disclosure is a gas sensor element which includes a solid electrolyte body having oxygen ion conductivity and detects a concentration of a specific gas in a measured gas based on an amount of oxygen ions which are conducted in the solid electrolyte body, the gas sensor element including: a measurement gas chamber into which the measured gas is introduced; a pump cell which includes a pump electrode which is provided on a surface of the solid electrolyte body; a sensor cell which includes a sensor electrode and is located downstream of the pump cell in a direction in which the measured gas is introduced, the sensor electrode containing noble metal and the pump electrode being located on the same surface of the measurement gas chamber, and reducing the specific gas in order to detect the concentration of the specific gas; and a pump-cell controller which adjusts a concentration of oxygen in the measured gas in the measurement gas chamber by applying a voltage to the pump cell, when the gas sensor element is activated before detecting the concentration of the gas, in order to remove oxygen occluded in the sensor electrode, the pump-cell controller decomposing a substance which is present in the measurement gas chamber by applying a removing voltage to the pump cell so that a reducing gas is generated, the sensor electrode having a plurality of noble metal regions which are made of the noble metal and electrolyte regions which are distributed so that an interface is generated between each of the electrolyte region and each of the plurality of noble metal regions, the sensor electrode having open pores which extend from an electrode surface of the sensor electrode and reach at least one of the plurality of noble metal regions.

According to the above configuration, the pores which are open on the electrode surface of the sensor electrode, that is, the open pores are present. This makes it possible to prevent the reducing gas from remaining on the surface of the sensor electrode and promote early diffusion and removal of the reducing gas. In particular, since the open pores are formed so as to reach the noble metal region, it is possible to more efficiently promote diffusion and removal of the reducing gas near the noble metal which contributes to ionization of the specific gas. That is, early transition of the sensor electrode to an activated state is possible.

DETAILED DESCRIPTION OF THE PREFERRED EMBODIMENTS

The following describes embodiments of the present disclosure with reference to the drawings. In each of the embodiments, portions corresponding to matters described in a previous embodiment are given the same reference signs and duplicate descriptions may be omitted. In each of the embodiments, in a case where only a part of a configuration is described, another embodiment previously described is applicable to other parts of the configuration. Besides possible combinations of portions specifically and explicitly stated in each of the embodiments, partial combinations of the embodiments not explicitly stated are also possible if such combinations have no particular problem.

(First Embodiment)

First, the following describes, with reference to FIGS. 1 to 4, a schematic structure of a gas sensor element and a gas sensor unit according to the present embodiment.

The gas sensor element according to the present embodiment is, for example, a NOx sensor which detects an amount of nitrogen oxide (NOx). Such a gas sensor element is disposed and used, for example, in an exhaust pipe through which an exhaust gas flows in an internal combustion engine. A measured gas is the exhaust gas, and a specific gas whose concentration is to be detected is NOx.

The gas sensor unit is a module including the gas sensor element. For example, in the exhaust pipe, the gas sensor unit is mounted as a unit.

The following description is based on the premise that the specific gas in the measured gas is NOx. Note, however, that the specific gas to be detected is not limited to NOx, and the gas sensor element can be implemented as a sensor which detects, for example, ammonia or other kinds of gas, depending on constituent materials of a solid electrolyte body and an electrode.

Figure 1:
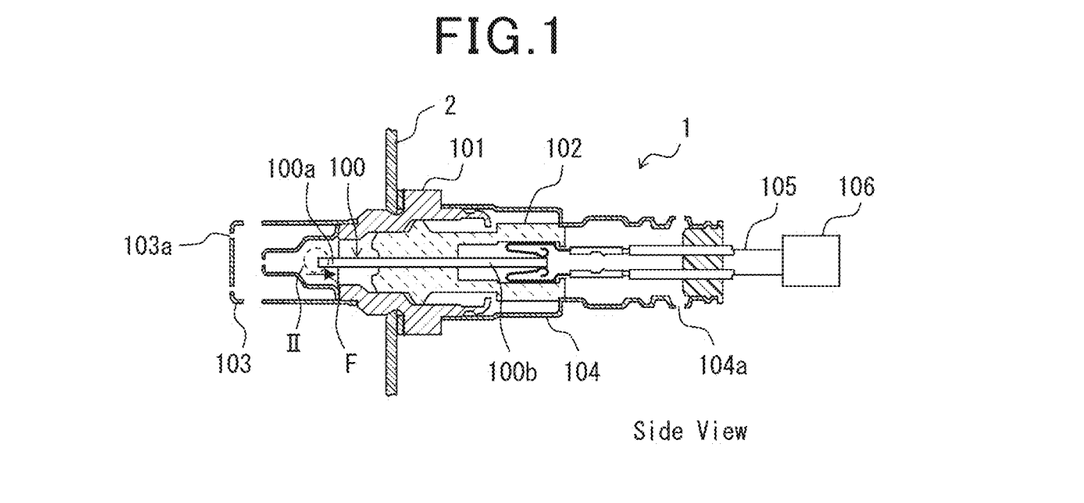
FIG. 1 is a side cross-sectional view showing a schematic structure of a gas sensor unit according to a first embodiment.

As shown in FIG. 1, a gas sensor unit 1 is disposed in an exhaust passage 2 of an internal combustion engine of a vehicle. An exhaust gas which flows through the exhaust passage 2 is introduced as the measured gas into the gas sensor unit 1. Then, the gas sensor unit 1 measures a NOx concentration in the measured gas with a gas sensor element 100 included in the gas sensor unit 1. Specifically, in addition to the gas sensor element 100, the gas sensor unit 1 is configured to include a sensor housing 101, an insulator 102, element covers 103 and 104, a plurality of sensor harnesses 105, and a sensor control circuit 106. Note that F in FIG. 1 indicates a gas flow direction in which the measured gas flows inside the gas sensor element 100.

The sensor housing 101 holds inside the gas sensor element 100 via the insulator 102. The covers 103 and 104 are fixed to the sensor housing 101. An upstream portion of the gas sensor element 100 is a first element end 100a and a downstream portion of the gas sensor element 100 is a second element end 100b in the exhaust gas flow direction. The second element end 100b faces the sensor control circuit 106, and the first element end 100a is located opposite to the second element end 100b. The element cover 103 covers an outer periphery side of the first element end 100a. The element cover 103 has a gas introduction hole 103a for introducing, as the measured gas, the exhaust gas from the exhaust pipe into the first element end 100a which is housed inside. The cover 104 covers an outer periphery side of the second element end 100b. The cover 104 has an air introduction hole 104a for introducing atmospheric air into the second element end 100b which is housed inside the gas sensor unit 1. The plurality of sensor harnesses 105 are provided so as to extend over inside and outside the cover 104. The sensor control circuit 106 is connected to the gas sensor element 100 via the plurality of sensor harnesses 105, outside the sensor housing 101 and the element cover 103. The sensor control circuit 106 according to the present embodiment includes a pump-cell controller 50 (described later) to supply a voltage to a pump cell 40 and controls voltage supply to a sensor cell 20 and a monitor cell 30.

Figure 2:
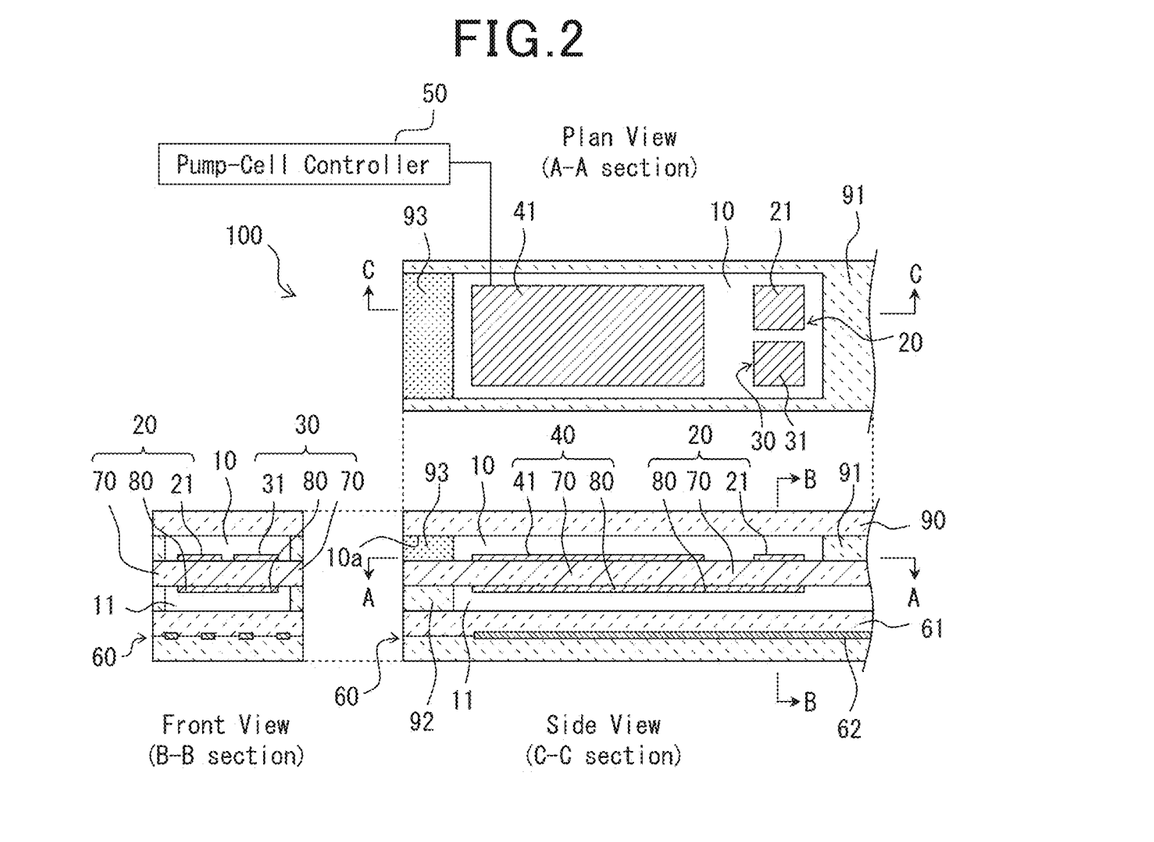
FIG. 2 is a cross-sectional view showing a detailed configuration of a gas sensor element.

The following describes a detailed configuration of the gas sensor element 100 with reference to FIG. 2. The gas sensor element 100 includes a measurement gas chamber 10, a reference gas chamber 11, the sensor cell 20, the monitor cell 30, the pump cell 40, the pump-cell controller 50, and a heater 60. The gas sensor element 100 is configured such that the heater 60, and a solid electrolyte body 70 and an insulation layer 90 (described later) are stacked. The measurement gas chamber 10 is formed as a space which is surrounded by the solid electrolyte body 70 and the insulation layer 90. The reference gas chamber 11 is formed as a space which is surrounded by the heater 60 and the solid electrolyte body 70. The following describes components of the gas sensor element 100 in detail.

The measurement gas chamber 10 is a space into which the exhaust gas which is the measured gas is introduced. The measurement gas chamber 10 is formed as a space which is sandwiched between the solid electrolyte body 70 and the insulation layer 90. The insulation layer 90 has a plate shape and is stacked via a first spacer 91 on the solid electrolyte body 70 having a plate shape. When the solid electrolyte body 70 is viewed from the front, the first spacer 91 forms a C-shape whose one side is open, and thus, the measurement gas chamber 10 has a box shape, with a part being open. The open part is an introduction port 10a for the exhaust gas. In the introduction port 10a according to the present embodiment, a diffusion resistance body 93 is disposed and the exhaust gas is introduced from the introduction port 10a into the measurement gas chamber 10 passing through the diffusion resistance body 93. That is, the exhaust gas is introduced into the measurement gas chamber 10 under predetermined diffusion resistance by the diffusion resistance body 93.

As the solid electrolyte body 70 according to the present embodiment, for example, yttria stabilized zirconia (YSZ) can be used. Under a temperature of not less than approximately 600° C., YSZ exerts a function as a solid electrolyte. The solid electrolyte body 70 is heated by the heater 60 (described later) so that the function as the solid electrolyte is maintained. As the solid electrolyte body 70, a material such as calcium oxide stabilized zirconia or alumina stabilized zirconia can also be used. As the insulation layer 90 and the first spacer 91, alumina or other commonly known insulation materials can be used.

The reference gas chamber 11 is a space into which a reference gas is introduced. The reference gas is used for generating a reference potential for calculating a concentration of NOx which is the specific gas. As the reference gas, for example, atmospheric air is introduced into the reference gas chamber 11. The reference gas chamber 11 is formed as a space sandwiched between the heater 60 and the solid electrolyte body 70. The solid electrolyte body 70 is stacked via a second spacer 92 on the heater 60 formed in a plate shape. When the solid electrolyte body 70 is viewed from the front, the second spacer 92 is formed on a side closer to the diffusion resistance body 93. In the reference gas chamber 11, an introduction port for the atmospheric air (not shown) is open toward a side opposite to the second spacer 92.

Thus, the solid electrolyte body 70 is formed so as to be located between the measurement gas chamber 10 and the reference gas chamber 11 and is exposed to both of the measurement gas chamber 10 and the reference gas chamber 11. This allows ions to move in the solid electrolyte body 70 in accordance with a difference between a NOx concentration in the exhaust gas and a NOx concentration in the atmospheric air so that a sensor current is generated.

The sensor cell 20 includes a sensor electrode 21, the solid electrolyte body 70, and a reference electrode 80. The sensor electrode 21 is formed on the solid electrolyte body 70 so as to be exposed to the measurement gas chamber 10. Meanwhile, the reference electrode 80 is formed on the solid electrolyte body 70 so as to be exposed to the reference gas chamber 11. That is, the solid electrolyte body 70 is sandwiched between the sensor electrode 21 and the reference electrode 80. According to the present embodiment, the sensor cell 20, the monitor cell 30, and the pump cell 40 share the solid electrolyte body 70 and the reference electrode 80.

The sensor electrode 21 is a noble metal catalyst containing platinum (Pt) and rhodium (Rh). Furthermore, the sensor electrode 21 contains a solid electrolyte which is made of YSZ identical in composition to YSZ of the solid electrolyte body 70. That is, the sensor electrode 21 is an electrode which is made of platinum and rhodium acting as catalysts and the solid electrolyte having ionic conductivity. The solid electrolyte contained in the sensor electrode 21 is integrally combined with the solid electrolyte body 70 constituting the sensor cell 20 so that ionic conduction is possible between the solid electrolyte and the solid electrolyte body 70.

NOx contained in the exhaust gas which has been introduced into the measurement gas chamber 10 is adsorbed to an exposed surface of noble metal and is ionized into nitrogen ions and oxygen ions by catalyst action. Among these, the oxygen ions are conducted in the solid electrolyte constituting the sensor electrode 21. The oxygen ions are further conducted to the solid electrolyte body 70 and are detected as the sensor current. Based on an amount of the sensor current, a concentration of NOx is detected. A detailed configuration of the sensor electrode 21 will be discussed later in detail.

The monitor cell 30 includes a monitor electrode 31, the solid electrolyte body 70, and the reference electrode 80. As described above, the monitor cell 30 shares the solid electrolyte body 70 and the reference electrode 80 with the sensor cell 20. The monitor electrode 31 is formed on a surface of the solid electrolyte body 70 so as to be exposed to the measurement gas chamber 10. The monitor electrode 31 is an electrode containing, for example, platinum (Pt) and gold (Au). Although the monitor electrode 31 is incapable of decomposing NOx, the monitor electrode 31 decomposes oxygen molecules so that an electric current caused by oxygen ions flows.

The monitor electrode 31 is formed next to the sensor electrode 21 in a direction approximately orthogonal to a flow direction of the exhaust gas flowing from the introduction port 10a to the sensor cell 20. That is, the sensor electrode 21 and the monitor electrode 31 are exposed in the same manner to the exhaust gas which is approximately uniformly introduced into the measurement gas chamber 10. The monitor cell 30 detects a concentration of residual oxygen contained in the exhaust gas in which an oxygen concentration has been adjusted by the pump cell 40. Specifically, the monitor cell 30 detects an electric current which is caused by the residual oxygen and flows in the solid electrolyte body 70. By subtracting an electric current which is caused by the oxygen ions and is outputted from the monitor cell 30 from an electric current which is caused by the oxygen ions and is outputted from the sensor cell 20, the gas sensor element 100 is capable of detecting a concentration of NOx by canceling an offset of an electric current caused by the oxygen ions and outputted from the sensor cell 20 which electric current is caused by the residual oxygen.

The pump cell 40 is located on a side closer to the introduction port 10a than the sensor cell 20 and the monitor cell 30 are. The pump cell 40 includes a pump electrode 41, the solid electrolyte body 70, and the reference electrode 80. The pump electrode 41 is formed on the solid electrolyte body 70 so as to be exposed to the measurement gas chamber 10. The pump electrode 41 is an electrode containing platinum (Pt) and gold (Au) as with the monitor electrode 31. The pump electrode 41 reduces oxygen so that oxygen ions are generated. The oxygen ions are conducted in the solid electrolyte body 70 to move to the reference electrode 80 side and is discharged into the reference gas chamber 11. Thus, the pump cell 40 is a cell which adjusts the oxygen concentration in the measurement gas chamber 10 by its pumping action. That is, on the introduction port 10a side, the pump cell 40 adjusts the oxygen concentration in the exhaust gas. With respect to the exhaust gas in which the oxygen concentration has been adjusted, the sensor cell 20 and the monitor cell 30 output an electric current caused by NOx and an electric current caused by the residual oxygen, respectively.

In addition, the pump cell 40 according to the present embodiment has a function of decomposing a substance contained in the exhaust gas so that a reducing gas (hydrogen) is generated. Specifically, the pump cell 40 decomposes water molecules contained in the exhaust gas so that hydrogen is generated. Hydrogen is reducing, and thus oxygen occluded in the sensor electrode 21 is reduced and removed by the hydrogen.

The pump-cell controller 50 is a section for applying a predetermined voltage to the pump cell 40 at a predetermined timing. The pump-cell controller 50 constitutes a part of the sensor control circuit 106 shown in FIG. 1. The application of a voltage to the pump cell 40 means that a potential difference is generated between the reference electrode 80 and the pump electrode 41. In the pump-cell controller 50, a normal voltage V1 can be applied to the pump cell 40 so that the pump cell 40 exhibits the pumping action for adjusting an oxygen concentration. Furthermore, a removing voltage V2 can be applied to the pump electrode 41 so that hydrogen which is the reducing gas is generated by decomposition of water molecules. The removing voltage V2 with respect to an electric potential of the reference electrode 80 is set to be approximately 0.5 V to 2.0 V, which is higher than 0.3 V to 0.4 V for the normal voltage V1.

Figure 3:
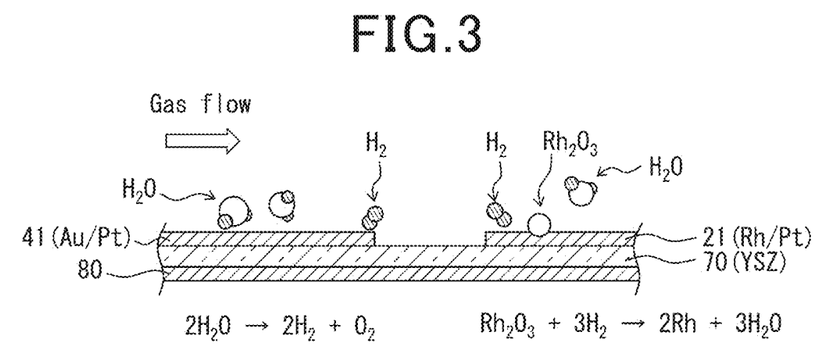
FIG. 3 is a conceptual diagram illustrating how a reducing gas is generated by a pump cell and reduction is performed in a sensor electrode by using the reducing gas.

As shown in FIG. 3, while the removing voltage V2 is being applied to the pump electrode 41, water molecules are decomposed so that hydrogen is generated. Hydrogen which is reductive generates water molecules by reducing oxygen ions which are combined with a rhodium atom constituting the sensor electrode 21 to form rhodium oxide (III) or oxygen ions which are adsorbed to a surface of the sensor electrode 21.

Figure 4:
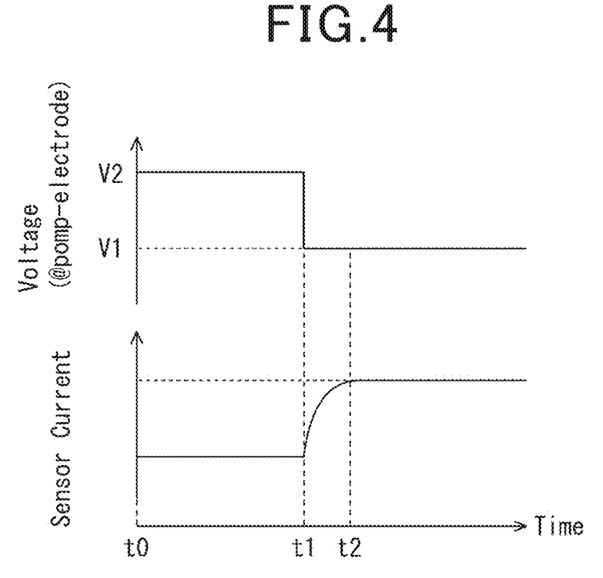
FIG. 4 is a graph showing changes over time in voltage which is applied to a pump electrode and in sensor current.

As shown in FIG. 4, when the gas sensor element 100 is activated (time t0), the pump-cell controller 50 applies the removing voltage V2 to the pump electrode 41 until a time t1 at which application of the normal voltage V1 is started. While the removing voltage V2 is being applied to the pump electrode 41, hydrogen which has been generated in the pump cell 40 reaches the sensor cell 20 and a sensor current changes. Specifically, the sensor current has a smaller current value as compared with a normal state where the normal voltage V1 is applied to the pump cell 40 and the pump cell 40 is driven in a normal condition. The sensor current having a smaller current value as compared with the normal state indicates that the hydrogen interacts with the sensor electrode 21.

At the time t1, the pump-cell controller 50 changes a voltage applied to the pump cell 40 from the removing voltage V2 to the normal voltage V1. Thus, the sensor current is increased and the pump cell 40 transitions to the normal state. After the transition to the normal state, that is, after a time t2, the sensor current changes depending on an amount of residual oxygen or a concentration of NOx and thus is actually not constant. In FIG. 4, however, a value of the sensor current is shown as a constant value for a simple explanation.

The heater 60 maintains a temperature of the solid electrolyte body 70 at not less than approximately 600° C. so that YSZ functions as the solid electrolyte. The heater 60 is formed such that a conductor layer 62 which generates heat by energization is provided between ceramics substrates 61. The conductor layer 62 is formed so that when surfaces on which the electrodes 21, 31, 41, and 80 are formed are viewed from the front, the conductor layer 62 overlaps the solid electrolyte body 70 and thus temperatures at least in and near portions in which the electrodes 21, 31, 41, and 80 are formed can be maintained at activation temperatures. Temperature distribution in the solid electrolyte body 70 achieved by the heater 60 needs to be set as appropriate depending on required performance. The arrangement of the conductor layer 62 can be set in accordance with required temperature distribution.

Figure 5:
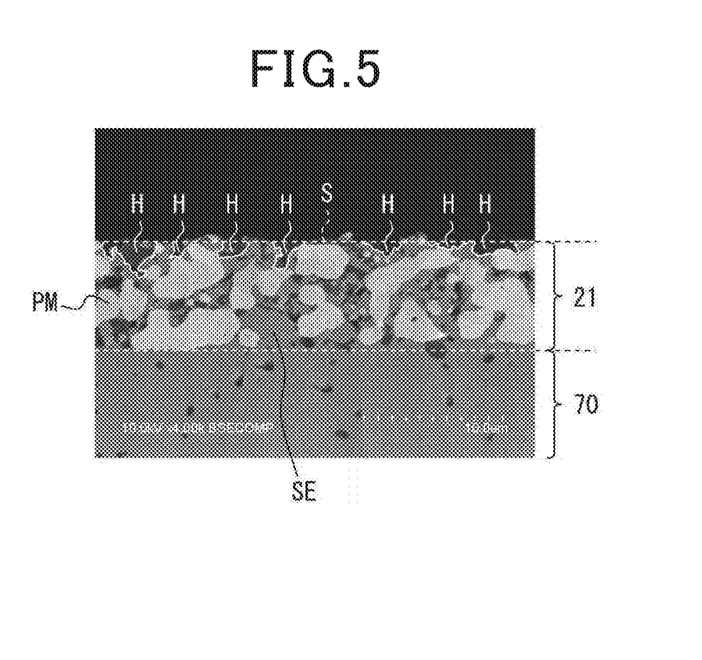
FIG. 5 shows a result of observation of a detailed configuration near the sensor electrode under a scanning electron microscope.
Figure 6:
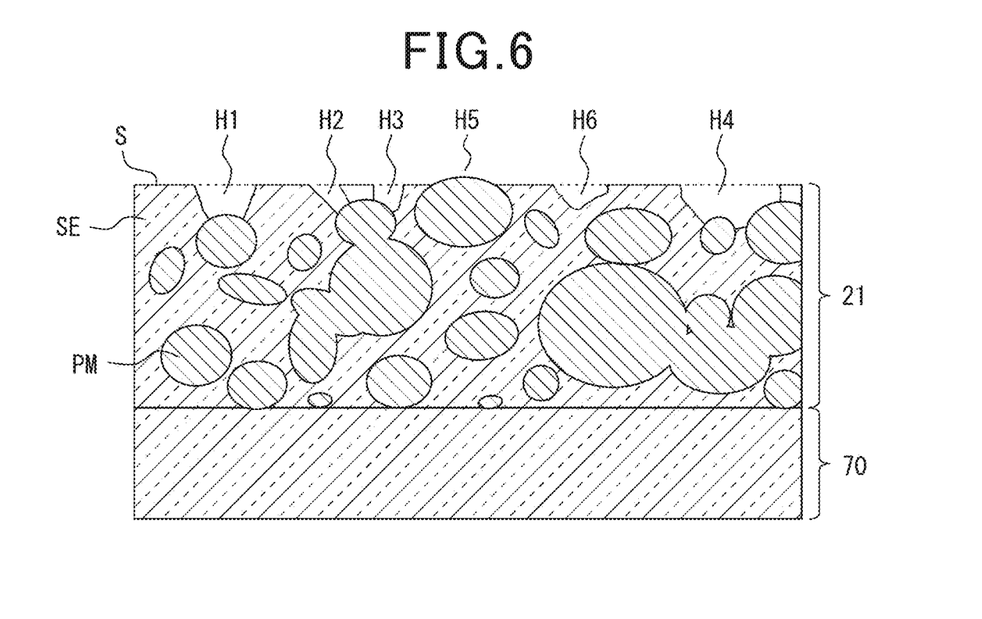
FIG. 6 is a cross-sectional view of the sensor electrode.

The following describes a detailed configuration of the sensor electrode 21 with reference to FIGS. 5 and 6.

FIG. 5 shows a result of observation, under a scanning electron microscope (SEM), of a cross-section of the sensor electrode 21 and the solid electrolyte body 70 which is a substrate of the sensor electrode 21 in the same direction as in the side view shown in FIG. 2. The cross-section in FIG. 5 shows a result obtained when a cross-section which is orthogonal to an electrode surface of the sensor electrode 21 and has a size of approximately 30 μm in a direction along the electrode surface is cut and observed.

The sensor electrode 21 is formed on the surface of the solid electrolyte body 70 which surface is exposed to the measurement gas chamber 10. As described above, the sensor electrode 21 is an electrode which functions as the noble metal catalyst containing Pt and Rh, and the sensor electrode 21 contains YSZ for ionic conduction.

In FIG. 5, regions which are observed to have a light gray color are noble metal regions PM containing Pt and Rh, and the regions form a plurality of clusters and constitute the sensor electrode 21. Meanwhile, a region which is observed to have a dark gray color is a solid electrolyte region SE. The solid electrolyte region SE enters gaps between the noble metal regions PM which are scattered, and forms a path for ionic conduction. Portions which are observed to have a black color are spaces containing none of Pt, Rh, and YSZ. Some of the portions communicate with an external space and others are buried inside the sensor electrode 21 or the solid electrolyte body 70.

In FIG. 5, a region constituted by portions which contain no noble metal and are observed to have a dark gray or have a black color as a void is the solid electrolyte body 70 which is the substrate. The solid electrolyte region SE of the sensor electrode 21 is made of the same material as that of the solid electrolyte body 70 which is the substrate. After the sensor electrode 21 is formed, the solid electrolyte region SE and the solid electrolyte body 70 are integrally connected to each other so that there is no distinction between the solid electrolyte region SE and the solid electrolyte body 70.

A region which is located on a side opposite to the solid electrolyte body 70 with respect to the sensor electrode 21 and is observed to have a black color is the space of the measurement gas chamber 10. That is, a boundary between the sensor electrode 21 and the space of the measurement gas chamber 10 is an electrode surface S of the sensor electrode 21.

The sensor electrode 21 has a plurality of pores as portions which are observed to have a black color in the observation under the scanning electron microscope. In particular, among the plurality of pores, a pore which extends from the electrode surface S and reaches a noble metal region PM is referred to as open pore H. The open pore H has some patterns. As shown in a pore in FIG. 6, there is a pore which is formed when a single pore which is open on the electrode surface S reaches a single noble metal region PM so that the noble metal region PM is exposed. As pores H2 and H3, there are pores which are formed when a plurality of pores which are open on the electrode surface S reach a single noble metal region PM so that the noble metal region PM is exposed. As a pore H4, there is a pore which is formed when a single pore which is open on the electrode surface S reaches a plurality of noble metal regions PM so that the noble metal regions PM are exposed. In a broad sense, the open pore H also includes a form in which a noble metal region PM is exposed to the electrode surface S. Such an open pore is given a sign H5 in FIG. 6. Meanwhile, the open pore H does not include a pore which is open on the electrode surface S but does not reach a noble metal region PM. That is, the open pore H includes the pores H1 to H5 but does not include a pore H6 in FIG. 6.

Assume that the open pore H is defined as above and a cross-section which is orthogonal to the electrode surface S of the sensor electrode 21 and has a size of at least not less than 30 μm in a direction along the electrode surface S is cut. In such a case, when a proportion of an area (cross-sectional area) of the open pore H to a total area of the sensor electrode 21 is referred to as a pore ratio, the pore ratio is preferably not less than 2% and not more than 15%. For example, in the example shown in FIG. 5, the pore ratio is approximately 10%.

Although the open pore H such as the pore H5 in FIG. 6 is an open pore in a broad sense, a percentage of an area of such an open pore to the total area of the sensor electrode 21 is zero.

The following briefly describes a method for forming the sensor electrode 21 configured as described above.

First, YSZ in a paste form containing noble metal powder which has been prepared so that a mass percentage of Rh to a total mass of Pt and Rh is approximately 40% is placed on the solid electrolyte body 70 which is the substrate. Then, the components of the gas sensor element 100 are assembled in an appropriate manner. The gas sensor element 100 thus assembled is placed under a reducing atmosphere, and an energization process is performed between the sensor electrode 21 and the reference electrode 80. At the time, in the sensor electrode 21, a Pt—Rh alloy is dispersed to the solid electrolyte body 70, and pores into which the measured gas flows are formed. The pores include the open pore H. In the reference electrode 80, Pt is dispersed to the solid electrolyte body 70, and a pore into which the reference gas (atmospheric air according to the present embodiment) flows is formed.

The pore ratio is determined depending on interrelationships between various parameters for energization such as voltage, electric current, time, temperature, and composition ratio of Pt to Rh. The pore ratio for the open pore H generated by the energization process is preferably not more than 15%. This is because the pore ratio exceeding 15% may cause an increase in contact resistance between the electrode surface S and a lead which is provided for connection of the sensor electrode 21 with another external device, for example, connection with the sensor control circuit 106, and this may cause conduction failure.

The energization process is performed under a nitrogen atmosphere which is an environment which is hypoxic and thus allows $RhO_2$ to be easily reduced. Accordingly, a small amount of open pore H is generated when oxygen constituting $RhO_2$ is removed, and this allows the open pore H at the pore ratio of approximately 2% to be always present.

When the energization process is performed, a part of $Rh_2O_3$ formed near the surface of the sensor electrode 21 is reduced. However, a phenomenon in which oxygen is removed from the solid electrolyte body 70 also occurs. Thus, in order to add oxygen to the solid electrolyte body 70, a reoxidation process is performed. When the reoxidation process is performed, the measurement gas chamber 10 is under a reducing gas atmosphere in which hydrogen as the reducing gas is a predetermined volume percentage and nitrogen is the remaining volume percentage. Instead of hydrogen, the reducing gas atmosphere can contain carbon monoxide, hydrocarbon, or the like. The reference gas chamber 11 is under an atmosphere air.

Then, the gas sensor element 100 is left standing for a predetermined time period while the heater 60 is energized so that the solid electrolyte body 70 is heated to an appropriate temperature at which the solid electrolyte body 70 has oxygen ionic conductivity. At the time, due to a difference in oxygen concentration between the atmosphere air and the reducing gas atmosphere, oxygen ions are conducted from the reference gas chamber 11 to the measurement gas chamber 10 via the solid electrolyte body 70. This allows oxygen to be added to the solid electrolyte body 70.

Since the reference gas chamber 11 is formed in the gas sensor element 100, enough oxygen is supplied to the reference electrode 80 in the reoxidation process. This makes it easier for the oxygen ions to be conducted from the reference electrode 80 to the sensor electrode 21.

Figure 7:
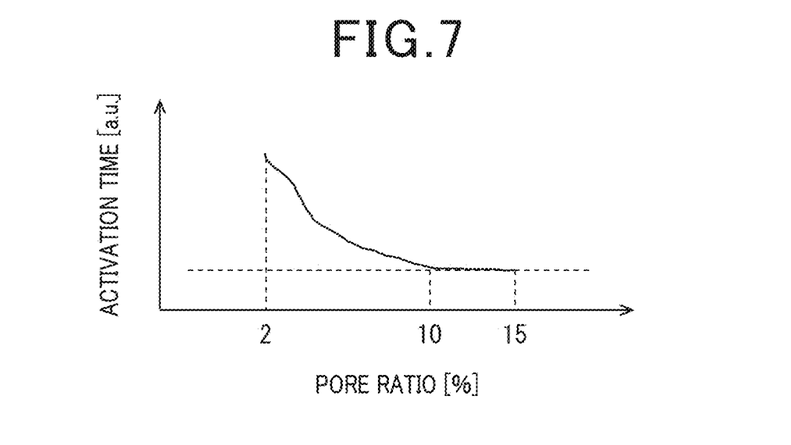
FIG. 7 is a graph showing activation time with respect to a pore ratio.

The following describes, with reference to FIG. 7, effects obtained by adopting the gas sensor element 100 and the gas sensor unit according to the present embodiment.

The gas sensor element 100 has the pore ratio of approximately 10% for the open pore H on the sensor electrode 21 constituting the sensor cell 20.

This makes it possible to prevent a reducing gas (hydrogen) generated by application of the removing voltage to the pump cell 40 from remaining on the surface of the sensor electrode 21 and allows early diffusion and removal of the reducing gas from an opening of the pore. That is, early diffusion of the reducing gas can be promoted. In particular, since the open pore H is formed so as to reach the noble metal region PM, it is possible to more efficiently promote diffusion and removal of the reducing gas near the noble metal which contributes to ionization of the specific gas. That is, early transition of the sensor electrode 21 to an activated state is possible.

Specifically, the inventor has examined, by an experiment, activation time required until the sensor electrode 21 reaches the activated state with respect to the pore ratio for the open pore H. FIG. 7 shows a result of the examination. The activation time shows a tendency to decrease as the pore ratio increases. With reference to FIG. 7, it can be surmised that, as described above, as the pore ratio is higher, hydrogen which is the reducing gas is less likely to remain on the surface of the sensor electrode 21, and this promotes activation of the sensor electrode 21.

In a region in which the pore ratio for the open pore H is not less than 10%, the activation time is almost saturated and does not greatly change. The excessively high pore ratio may cause an increase in contact resistance between the sensor electrode 21 and another member (e.g., lead). Thus, the pore ratio is preferably approximately 10%, and within an optimum range for the pore ratio of 2% to 15%.

(Other Embodiments)

Although in the aforementioned embodiment, the gas sensor element 100 including the monitor cell 30 has been described, the monitor cell 30 is not an essential component in terms of detecting a concentration of the specific gas in the measured gas. Note, however, that the gas sensor element 100 including the monitor cell 30 is preferable in terms of accurately detecting an oxygen concentration in the gas in which the oxygen concentration has been adjusted by the pump cell 40 and correcting background for output of the sensor cell 20.

Furthermore, although in the aforementioned embodiment, the noble metal containing Pt and Rh has been described as the noble metal constituting the sensor electrode 21, the element Pt or Rh can be substituted by palladium (Pd) or ruthenium (Ru) or these elements can be added to Pt and Rh.

Figure 8:
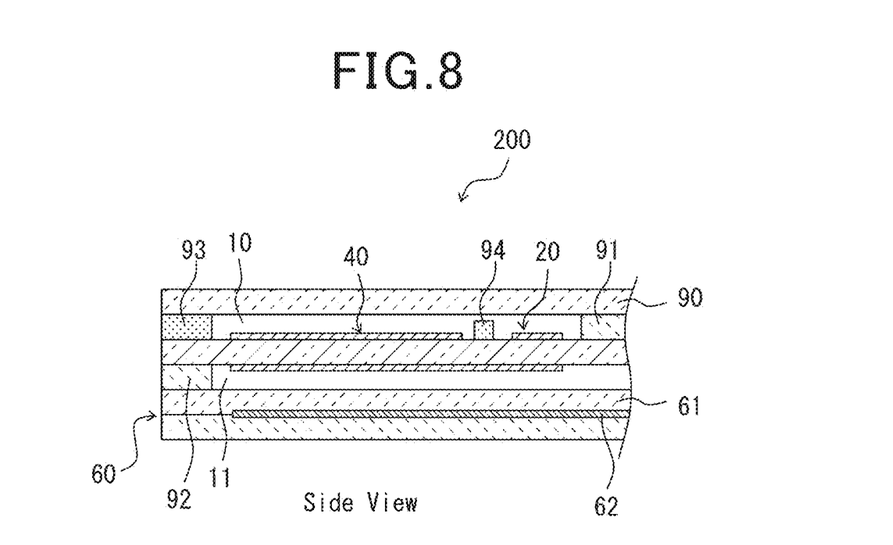
FIG. 8 is a cross-sectional view showing a detailed configuration of the gas sensor element according to anther embodiment.

The measurement gas chamber 10 can be configured such that a space in which the sensor cell 20 is formed and a space in which the pump cell 40 is formed are separated from each other so that the measured gas is movable between these spaces. Specifically, for example, in the gas sensor element 200 shown in FIG. 8, a diffusion rate determining body 94 is formed between the space in which the sensor cell 20 is formed and the space in which the pump cell 40 is formed. The diffusion rate determining body 94 divides the sensor cell 20 from the pump cell 40 to partition the space of the measurement gas chamber 10. In this case, while adjusting diffusion resistance, the diffusion rate determining body 94 allows the measured gas to pass through.

According to the aforementioned embodiment, the result of observation under the scanning electron microscope shown in FIG. 5 is used for calculation of the pore ratio. FIG. 5 shows the result obtained when the cross-section which is orthogonal to the electrode surface of the sensor electrode 21 and has the size of approximately 30 µm in the direction along the electrode surface is cut and observed under the scanning electron microscope. However, the size of the cross-section is not limited to 30 µm. For the calculation of the pore ratio, the cross-section is preferably cut so that the cross-section has a size of 30 µm or more in the direction along the electrode surface.

According to the aforementioned embodiment, although the pore ratio is defined as the percentage of the area of the open pore to the total area of the sensor electrode, the pore ratio can be defined differently. For example, the pore ratio can be defined as a proportion of a curve length of a portion forming the open pore to a curve length along the electrode surface having convex and concave parts including the open pore H, when the cross-section orthogonal to the electrode surface of the sensor electrode 21 is viewed. Alternatively, the pore ratio can be defined as a proportion of the open pore to the whole electrode surface S of the sensor electrode 21, when the electrode surface S of the sensor electrode 21 is viewed from the front.

The invention claimed is:

1. A gas sensor element which includes a solid electrolyte body having oxygen ions conductivity and detects a concentration of a specific gas in a measured gas based on an amount of oxygen ions which are conducted in the solid electrolyte body, the gas sensor element comprising:

a measurement gas chamber into which the measured gas is introduced;

a pump cell which includes a pump electrode which is provided on the solid electrolyte body;

a sensor cell which includes a sensor electrode and is located downstream of the pump cell in a direction in which the measured gas is introduced, the sensor electrode containing noble metal and the pump electrode being located on a same surface of the measurement gas chamber, and reducing the specific gas in order to detect the concentration of the specific gas; and a pump-cell controller which adjusts a concentration of oxygen in the measured gas in the measurement gas chamber by applying a voltage to the pump cell, when the gas sensor element is activated before detecting the concentration of the measured gas, in order to remove oxygen occluded in the sensor electrode, the pump-cell controller decomposing a substance which is present in the measurement gas chamber by applying a removing voltage to the pump cell so that a reducing gas is generated, the sensor electrode having a plurality of noble metal regions which are made of the noble metal and electrolyte regions which are distributed so that an interface is generated between each of the electrolyte regions and each of the plurality of noble metal regions, the sensor electrode having open pores, each of the open pores extending from an electrode surface of the sensor electrode and reaching at least one of the plurality of noble metal regions, wherein:

a partial cross section defined as a cut orthogonal to the electrode surface of the sensor electrode of a size of at least 30 µm along the electrode surface, wherein a percentage of a total area of the open pores on the partial cross section to a total area of the partial cross section is equal to or greater than 2% and equal to or smaller than 15%.

2. The gas sensor element as set forth in claim 1, wherein the noble metal contains at least platinum and rhodium.

3. The gas sensor element as set forth in claim 2, wherein a mass percentage of rhodium contained in the noble metal to a total mass of platinum and rhodium is not less than 30% and not more than 80%.

4. A gas sensor unit comprising:

the gas sensor element recited in claim 1;

a sensor housing which holds the gas sensor element inside;

an element cover which is fixed to the sensor housing to cover a first element end of the gas sensor element and introduces the measured gas into the first element end, the first element facing a flow of the measured gas; and a sensor control circuit which controls a voltage applied to the pump electrode and the sensor electrode.

5. The gas sensor element as set forth in claim 1, wherein the electrode surface is cut to be removed resulting in the partial cross section remaining along the at least 30 µm size.

* * * * *